United States Patent [19]

Yenzer

[11] Patent Number: 4,637,575
[45] Date of Patent: Jan. 20, 1987

[54] HELICOPTER AIRMOBILE WORK PLATFORM FOR WORKING ON POWER LINES AND TOWER STRUCTURES

[76] Inventor: Scott H. Yenzer, 1145 Asturia Ave., Coral Gables, Fla. 33134

[21] Appl. No.: 657,492

[22] Filed: Oct. 4, 1984

[51] Int. Cl.$^4$ ............................................. B64D 11/00
[52] U.S. Cl. ............................ 244/118.5; 244/137 R; 244/118.1; 174/5 R; 182/150
[58] Field of Search ............... 244/118.2, 118.3, 118.5, 244/129.1, 137 R, 17.11, 17.17; 182/142, 145, 150; 174/5, 5 SG, 5 SB

[56] References Cited

U.S. PATENT DOCUMENTS

| | | | |
|---|---|---|---|
| 3,139,948 | 7/1964 | Rorden | 174/5 SG |
| 3,421,165 | 1/1969 | Pugh | 9/14 |
| 3,604,660 | 9/1971 | Marley | 244/17.11 |
| 3,863,736 | 2/1975 | McWilliams | 182/150 |
| 3,904,155 | 9/1975 | Chavis | 244/118 R |
| 3,904,156 | 9/1975 | Smith | 244/118 R |
| 3,934,847 | 1/1976 | Bentivegna | 244/137 P |
| 4,422,528 | 12/1983 | Patterson | 182/145 |
| 4,478,312 | 10/1984 | Kurtgis | 182/150 |

OTHER PUBLICATIONS

"EHV Barehand Conductive Suit and Jacket", Chance, Jul. 1971.

Primary Examiner—Trygve M. Blix
Assistant Examiner—Lynn M. Fiorito
Attorney, Agent, or Firm—Fleit, Jacobson, Cohn & Price

[57] ABSTRACT

A work platform and helicopter assembly for working on a high-voltage power line such as an EHV power line. A work platform comprising a rectangular base of electrically conductive material is disposed transversely across a pair of helicopter skid tubes that extend longitudinally beneath the helicopter fuselage. The work platform is attached to the skid tubes such that the skid tubes may be laterally displaceable, upon landing, or take-off, with respect to the work platform. The work platform includes a workman supporting portion that extends laterally from the side of at least one skid tube to support a workman working on a high-voltage power line. The work platform, skid tubes and helicopter are electrically connected so that they will all be at the same electrical potential when working on a power line. The work platform may include a portion adapted to carry cargo between the skid tubes. A ballast is provided to the work platform, at the end of the work platform opposite from the workman supporting portion, so as to maintain the helicopter with the lateral center of gravity limits.

23 Claims, 6 Drawing Figures

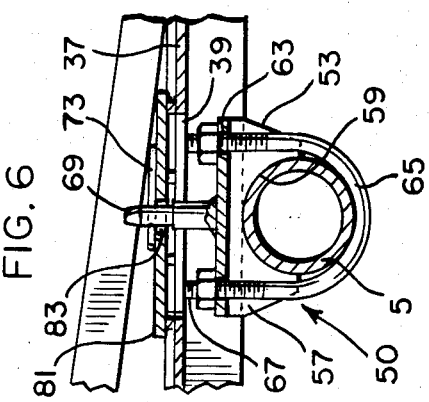
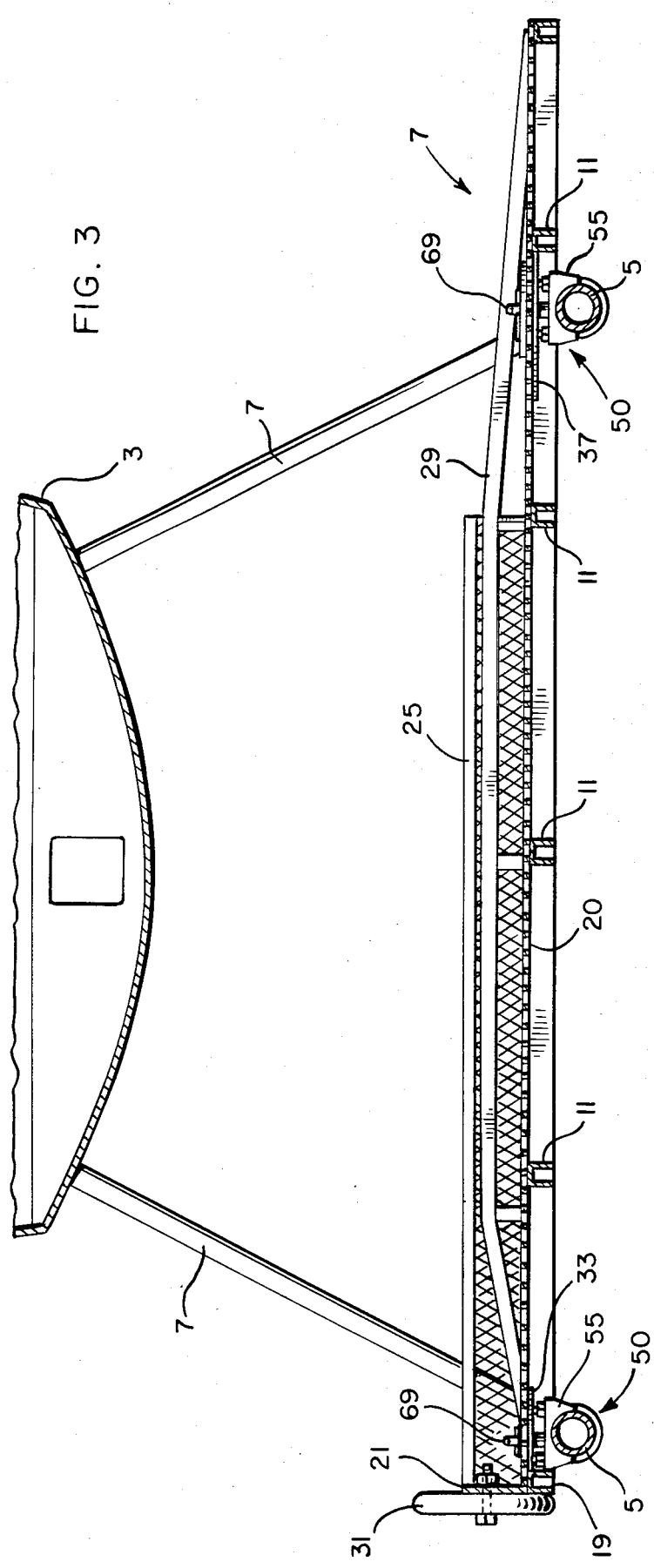

HELICOPTER AIRMOBILE WORK PLATFORM FOR WORKING ON POWER LINES AND TOWER STRUCTURES

BACKGROUND OF THE INVENTION

The present invention relates to a work platform for attachment to a helicopter. In particular, a platform is adapted for attachment to the helicopter skid tubes that extend longitudinally beneath the helicopter fuselage. The platform includes a lateral portion adapted to support a lineman working on high voltage power lines.

High voltage power lines, particularly the EHV (Extremely High Voltage) power lines, generate substantial electrical fields that make repair work extremely difficult. Various methods have been devised for protecting a lineman working on such power lines. For example, one technique, known as the bare hand method, requires that the lineman be surrounded by a Farady cage, which is electrically connected to the power line so that effectively there is no potential difference between the lineman and the power line. The Faraday cage may comprise an electrically conductive suit that the lineman wears and couples directly to the line. The lineman typically is positioned adjacent to the power line by means of a bucket truck, wherein a ground-supported truck elevates a bucket, holding a lineman, adjacent to the power line. The bucket must be insulated from the ground. The bucket is electrically connected to the power line so that no potential difference exists. Such technique has inherent dangers should the insulation between the bucket truck and the ground be incomplete or defective.

A further difficulty in working on power lines of the EHV type is that frequently repairs are required in remote areas that are inaccessible to land vehicles, such as the above-described bucket trucks. In such cases, the electrical power must be turned off, which is economically disadvantageous and operationally undesirable. Alternatively, the lineman uses long insulated poles, with tools attached at the pole end, to make the necessary repairs. Such technique is cumbersome.

Thus, a need exists for an apparatus and method for working on EHV-type power lines, or other high-voltage power lines, that is quick and economical and yet completely safe for the lineman. As will be described hereinbelow, the present invention provides for an apparatus and method of supporting a lineman from a hovering helicopter, wherein the lineman stands, sits or lies on an easily detachable work platform to perform the necessary work.

Prior art cargo carriers or baskets attached to helicopters are known. However, such attachments are not generally suitable for supporting a lineman from a hovering helicopter to enable him to work on high voltage power lines.

SUMMARY OF THE INVENTION

The present invention relates to a helicopter with associated work platform mounted detachably thereto. Preferably, the work platform is mounted directly to the helicopter skid tubes that extend longitudinally beneath the helicopter. The work platform is electrically connected to the helicopter, via the mechanicial connection to the skid tubes, as well as by an electrically conductive wire. At least a portion of the platform extends laterally from at least one side of the helicopter to enable a workman, wearing an electrically conductive suit such as a steel suit, to be supported by the platform. The conductive suit is also electrically connected to the platform. The helicopter carries the lineman adjacent to the power line and hovers in that position. The lineman electrically couples himself to the power line so that the potential between the line, the lineman, the work platform, and the helicopter itself are all at the same potential. In addition, the helicopter pilot wears an electrically conductive suit which is similarly connected to the helicopter structure. In essence, all components of the helicopter structure are coupled together to be at the same electrical potential. Since the helicopter is hovering in the air, there is no risk of an electrical path to the ground.

The present invention further includes a new and unique coupling arrangement for coupling the work platform directly to the helicopter skid tubes. The skid tubes are laterally movable with respect to each other so that when the helicopter is in contact with the ground, the skid tubes are capable of lateral movement ot absorb any destructive vibration. The coupling arrangement of the present invention provides the work platform to be able to remain attached to the helicopter while still allowing the skid tubes to move laterally as required for take-off and landing.

The work platform of the present invention provides for a rectangular base of light weight, preferably of expanded aluminum mesh. The platform base extends between and is supported by the helicopter skid tubes. At least a portion of the base extends laterally from one or both sides of the helicopter to enable a workman to be situated thereon. The portion of the base lying between the skid tubes may be used to carry cargo.

Thus, it is an object of the present invention to provide a work platform detachably coupled with the skid tubes of a helicopter for supporting a workman adjacent to a high-voltage power line. The attachment is made without any permanent modification to the helicopter skid tubes, such as drilling, which would distort or weaken the helicopter structure.

It is further an object of the present invention to provide a work platform that is electrically connectable with the helicopter to enable the workman to couple himself with the power line and the work platform so that all are at substantially the same electrical potential.

Still further, it is an object of the present invention to provide a new and unique attachment apparatus to enable a work platform to be attached to the helicopter skid tubes and yet allow the helicopter skid tubes to be laterally displaceable.

Still further, it is an object of the present invention to permit work on a high-voltage power line by means of a hovering helicopter adjacent to the line. The present invention provides a light-weight, easily attachable and detachable work platform, for attachment to helicopter skid tubes, that includes a cargo-carrying portion and a workman supporting portion.

These and other objects of the invention will be apparent when reference is made to the following detailed description and accompanying drawings.

BRIEF DESCRIPTION OF THE DRAWINGS

FIG. 3 is a longitudinal sectional view along line 3—3 of FIG. 1.

FIG. 4 is a transverse sectional view along line 4—4 of FIG. 1.

FIG. 5 is a section along line 5—5 of FIG. 2.

FIG. 6 is a section along line 6—6 of FIG. 2.

DETAILED DESCRIPTION OF A PREFERRED EMBODIMENT

Figure 1:
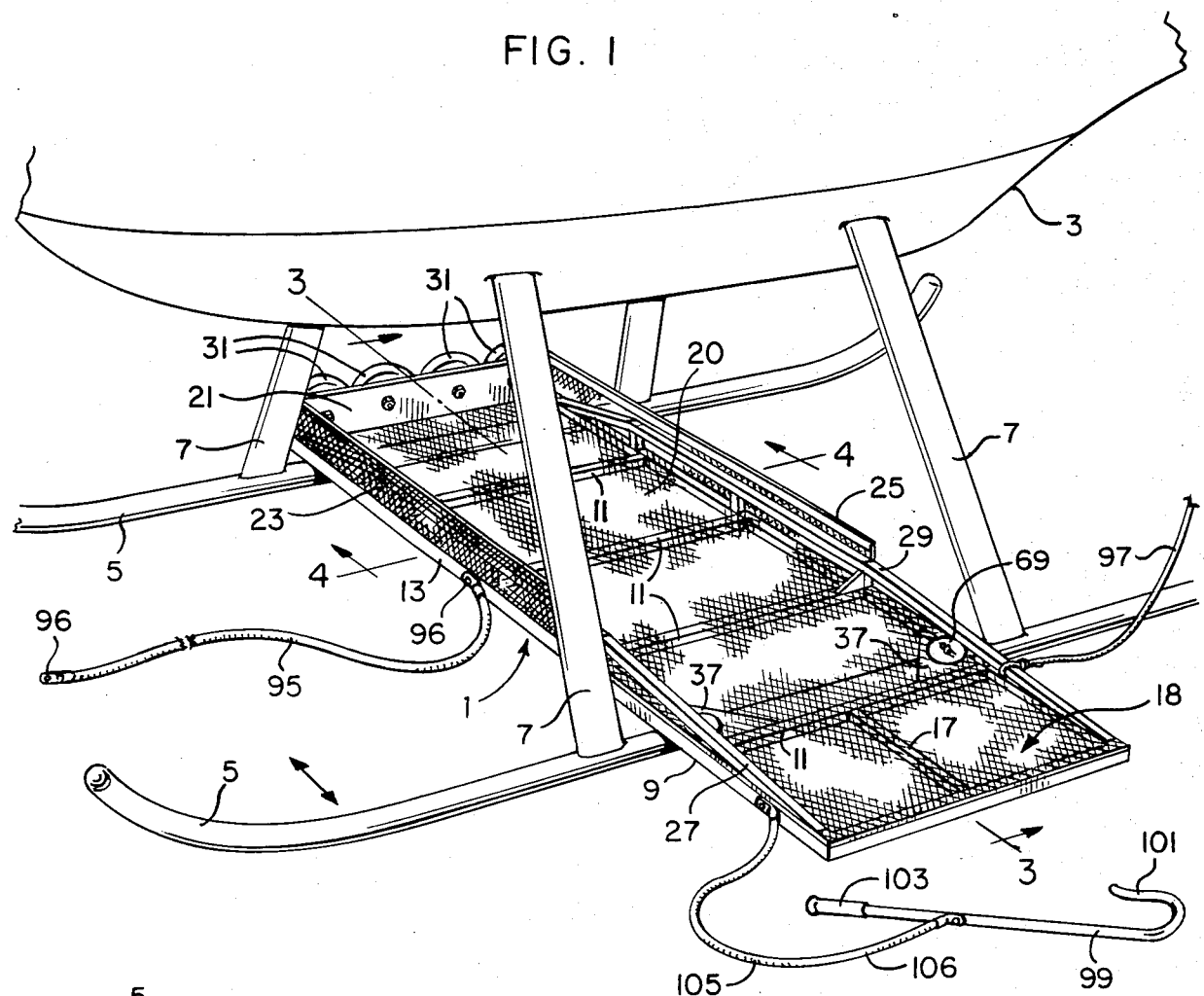
FIG. 1 is a perspective view of the work platform attached to the helicopter skid tubes.
Figure 2:
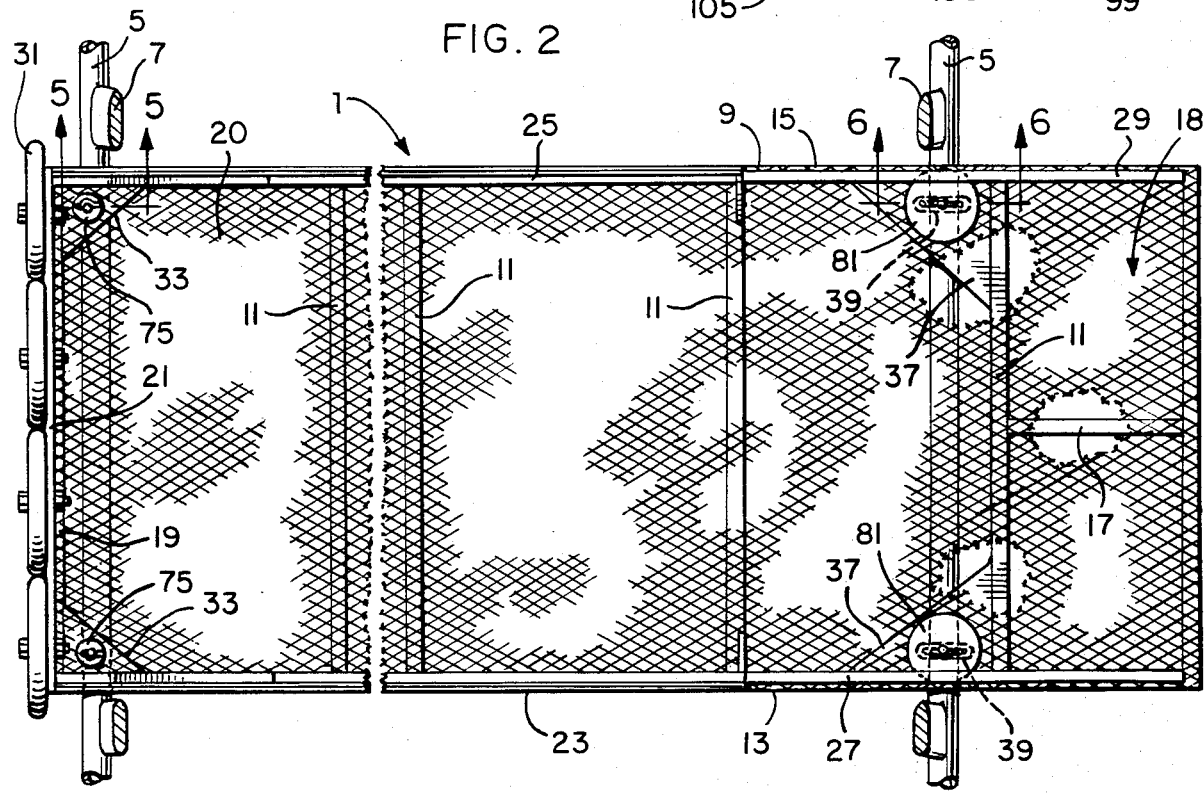
FIG. 2 is a plan view of the work platform attached to the skid tubes.

The work platform 1 of the present invention is connectable to a helicopter 3 by detachably connecting the work platform with the helicopter skid tubes 5. The skid tubes 5 extend longitudinally beneath the helicopter 3 fuselage and are attached to the underside of the helicopter by skid supports or struts 7. The helicopter fuselage, the skid supports 7, and the skid tubes 5 are of electrically conducting material, and electrically connected to each other, so that they are all at the same electrical potential. In the preferred embodiment, the helicopter is a Hughes 369D model, although other helicopters having similar skid tube assemblies may be used in conjunction with the work platform of the present invention. As is typical of the Hughes Model 369D, the skid supports or struts 7 are capable of flexing when the helicopter lands. That is, upon landing or take-off of the helicopter, the skid supports 7 flex outwardly (or inwardly on take-off) and the skid tubes 5 similarly are displaced laterally with respect to each other upon landing or take-off.

The work platform 1 comprises a generally rectangular frame or base 9 made of electrically conducting rectangular channel members. The length of the rectangular frame 9 along its major axis is greater than the distance between the skid tubes 5 so that the frame may be supported by the skid tubes and overhang from at least one side of the skid tubes a sufficient distance to permit a workman to be situated thereon. The length of the rectangular frame along its minor axis is sized so as to fit between the skid supports 7 that hang down from the underside of the helicopter 3. Preferably, for the Hughes helicopter described above, the length along the major axis of the rectangular frame 9 is at least 114 inches, whereas the length along the minor axis is approximately 42 inches.

A plurality of parallel channel members 11 join the forward edge 13 and the rearward edge 15 of the base 9 for additional support. In addition, a channel member 17 is provided parallel with the major axis of the base 9 to provide additional support at the laterally extending portion upon which the workman stands. This laterally extending portion 18 is the workman support portion. The space defined by the rectangular base 9 is covered with expanded sheet mesh to define a strong yet lightweight base.

Extending upward from one end 19 of the base is a side panel 21 preferably of aluminum sheet. This upstanding side panel 21 is generally adjacent the right-hand skid tube 5. (As used herein, "left-hand" and "right-hand" are deterined with reference to the helicopter pilot.) Disposed along the edges 13 and 15 of the base 9 are upstanding side portions 23 and 25 which extend from the side panel 21 approximately two-thirds of the overall length of the base 9 along the major axis. These side portions 23 and 25 typically end prior to reaching the left-hand skid tube 5. Channel support members 27 and 29 are provided as shown to provide support for the side members 23 and 25.

Removably attachable to the side panel 21 are various ballast elements 31. Such ballast elements may comprise plate-shaped weights that can be connected with the panel 21 by any suitable attachment, such as bolting. Alternatively, a box-type enclosure for enclosing metal weights may be connected with the frame 9 at the extreme right-hand end of the frame 9. Still further, hand-operated tools, such as pneumatic pumps, may be attached to the side panel 21, which could also serve as the ballast. The amount of ballast selected should be that amount necessary to keep the entire helicopter, with work platform attached, within lateral center of gravity limits to meet FAA airworthiness requirements. That is, since a workman would normally be situated on the workman support portion 18 of the base 9, a counter weight provided by the ballast 31 is necessary to keep the lateral center of gravity of the helicopter within certification standards. For the Hughes model referenced above, the lateral center of gravity must be within plus or minus 3 inches, as required by the FAA.

It should be noted that the area defined by the base 9 and the sides 23, 25 and 21 define a cargo-carrying portion. That is, such portion may carry cargo to be transported. A suitable cover arrangement (not shown) must be provided to enclose the top of the sides 23, 25 and the end 21 when cargo is carried.

Welded to the underside of base 9 in the corners defined by the forward and rearward edges 13 and 15 and the end 19, are a pair of triangular plates 33. These plates include circular openings 35 which are adapted to receive a stud in a manner to be described below.

Near the opposite end of the base 9 are a further pair of triangular plates 37 which are similarly welded to the underside of the base 9. These triangular plates 37 are positioned so as to substantially overlie the left-hand skid tubes 5. An elongated slot 39 is disposed in each of the plates and positioned so that its major axis is substantially perpendicular to the skid tubes 5. The minor axis of the slot 39 is sized so as to receive a stud and to permit the stud to be movable along the length of the slot 39, in a manner to be described.

Bolted to the skid tubes 5 are four attachment assemblies 50. The attachment assemblies 50 comprise a skid tube mating portion 53 defined by a pair of plates 55 and 57 that include a semi-circular cutout portion 59 which is adapted to be mounted flush with the skid tubes 5. The top portion 61 of the mounting assembly 50, extending between the plates 55 and 57 define a web which has a pair of openings 63 for receiving the ends of a U-bolt 65. The u-bolt 54 mates around and under the skid tubes and its threaded portions 67 extend through the web openings 63 to receive a bolt for securely, yet removably, fastening the mounting assemblies to the skid tubes.

Extending upwardly from the web 61 is a pin or stud 69 which includes a transverse opening 71 for receiving a pin clip 73. The diameter of the upwardly extending fitting or stud 69 is such as to extend through the circular openings 35 of the triangular plates 33 and through the elongated slots 39 of the triangular plates 37. The mounting assemblies 50 are mounted to the skid tubes so that they are spaced apart a sufficient distance so as to be able to extend through the openings 35 and 39 of the triangular plates.

The work platform 1 overlies the skid tubes such that the studs 69 of the mounting assemblies 50 extend through the openings in the triangular plates are discussed above. With respect to triangular plates 33, a washer 75 is disposed over the stud 69 and a pin clip 73 is inserted through the opening 71 of the stud to secure the work platform to the skid tube 5 in a relatively rigid manner. With respect to triangular plates 37, a circular plate 81 of approximately six-inch diameter is disposed over the stud 69 through a center opening 83. Pin clips 73 are inserted through the stud opening 71 so as to secure the base 9 of the work platform 1 between the plate 81 and the skid tube 5.

As discussed above, the diameter of the stud 69 is less than the minor axis of the longitudinal slot 39 so as to permit the stud 69 to move within the slot 39. Thus, when the helicopter lands, and the skid tubes 5 are laterally displaceable in an outward direction, i.e., away from the centerline of the helicopter, the left-hand skid tube 5 may be laterally displaceable. It should also be noted that the work platform 1 is not tightly sandwiched between the circular plate 81 and the web 61, thus permitting a relatively loose fit.

Although the work platform 1 is depicted so that it extends laterally from only one side of the helicopter, i.e., from the left-hand skid tube 5, it should be apparent that the platform can be designed so that it can similarly extend from the opposite or right-hand skid tube. By extending the base of the work platform equally in both lateral direction, so that the platform is symmetrical, the amount of ballast 31 needed will be substantially less. Moreover, the amount of ballast 31 needed may be more precisely calculated.

As discussed above, in order to work on high-voltage power lines, it is necessary that a perfect electrical connection exist between the work platform 1, the skid tubes 5, the skid supports 7 and the helicopter fuselage. In order to ensure that such electrical connection is made and maintained, separate electrical connectors 95, preferably formed of a wire gauge sufficient to handle the voltage, are provided for connection between the work platform 1 and the helicopter fuselage. The connector 95 includes terminal lugs 96 that are bolted to the mesh or frame and to the helicopter structure (not shown). Further, a separate electrical connection between the workman, i.e., the conductive suit worn by the workman, and the work platform is also provided by an electrical connector 97. This connector is integral with the suit and is physically tied to the mesh or frame.

As was discussed earlier, when the helicopter with the attached work platform 1 approaches a high-voltage power line, and hovers adjacent thereto, it is necessary for the workman within his conductive suit, to electrically connect himself with the power line so that there is no potential difference between the power line and the workman and the work platform. In order to provide such electrical connection with the power line, the workman grips an electrically conductive wand 99 which includes an elongated member having a cable coupling portion 101 for releasably coupling the power line cable to the wand. This cable coupling portion may be a generally U-shaped end portion that is spring biased to couple with the power line as the helicopter approaches. The wand includes an electrically connecting gripping portion 103 which is adapted to be manually held in the hand of the workman. Again, in order to ensure that there is electrical connection between the power line via the wand 99 and the work platform 1, an electrical connector 105, formed of a wire gauge sufficient to handle the voltage, extends between the wand and the work platform 1. The electrical connector 105 includes a breakaway link 106. In the event the helicopter must leave quickly, in an emergency condition, the workman releases the wand 99 and it breaks away from the platform.

In operation, as the helicopter approaches the power line, the workman sits on the work support portion of the work platform 1 with the wand 99 in his hand. The workman extends his arm with the wand 99 to its full extension and aims the wand at the power line. Arcing will normally occur between the end of the wand 99 and the power line and the workman will clamp the cable coupling portion 101 of the wand to the line. At this point, every component is at the same electrical potential and the workman can safety perform his work on the line. When the work is completed, the cable coupling portion 101 of the wand 99 is disconnected, the helicopter, still hovering, is backed off, and the helicopter slowly hovers away from the power line. It is thus seen that efficient and safe repair work on high-voltage power lines can be effected without the use of a ground-based transport system.

The above describes a specific and preferred embodiment of the present invention. It should be appreciated that the scope of this invention is not limited to that described above, but solely with reference to the following claims.

I claim:

1. A work platform adapted for attachment to a pair of helicopter skid tubes that extend longitudinally beneath a helicopter fuselage, substantially parallel to each other, for supporting a workman working on high-voltage power lines comprising;

a rectangular base having a length along its major axis greater than the distance between the helicopter skid tubes, said base including a workman support portion;

attachment means for directly attaching said base to each of the helicopter skid tubes such that at least one skid tube is capable of lateral movement with respect to the base.

2. A work platform as claimed in claim 1 wherein said attachment means comprises a pair of elongated openings in said rectangular base elongated in a direction transverse to the longitudinal direction of the skid tubes, each elongated opening overlying one of the helicopter skid tubes, and for receiving a fitting pin extending upwardly from the helicopter skid tube such that the fitting pin is movable within the elongated opening.

3. A work platform as claimed in claim 2 wherein said attachment means further comprises a pair of retaining plates and fastening means for fastening each of said retaining plates to the fitting pins to inhibit movement of the rectangular base along the length of the fitting pin and upwardly from the skid tube.

4. A work platform as claimed in claim 1 further comprising side portions extending perpendicularly upward from said rectangular base.

5. A work platform as claimed in claim 4 wherein said side portion extend from the perimeter of said rectangular base on three sides of the base.

6. A work platform as claimed in claim 1 wherein said workman support portion extends from at least one end of said rectangular base and is adapted to extend laterally outward from one of said skid tubes.

7. A work platform as claimed in claim 1 wherein said rectangular base is of electrically-conductive material.

8. A work platform as claimed in claim 7 wherein said rectangular base comprises a rectangular frame with a metallic mesh area lying within said frame.

9. A work platform as claimed in claim 1 wherein said attachment means includes means for attaching said base to each of the helicopter skid tubes such that one of the pair of skid tubes is capable of lateral movement with respect to the base and the other of the pair of skid tubes is fixed to move with the base.

10. A work platform and helicopter assembly for working on high-voltage power transmission lines comprising,
   a helicopter having a pair of helicopter skid tubes extending longitudinally beneath the helicopter fuselage and substantially parallel to each other;
   a work platform comprising a rectangular base of electrically conductive material having a length along it major axis greater than the distance between said helicopter skid tubes;
   attachment means for directly attaching said work platform to each of said helicopter skid tubes such that a first portion of said rectangular base lies between said pair of skid tubes and a second portion extends laterally and outwardly from at least one of said skid tubes;
   electrical conducting means for electrically connecting said work platform with said helicopter fuselage.

11. A work platform and helicopter assembly as claimed in claim 10 wherein said attachment means comprises means for attaching said base to said helicopter skid tubes such that one skid tube is laterally movable with respect to said base and the other skid tube is affixed for movement with the base.

12. A work platform and helicopter assembly as claimed in claim 11 wherein each of said helicopter skid tubes include a pair of studs extending upwardly from the top of the skid tubes, and wherein said attachment means includes four openings in said rectangular base for receiving said studs, two of said openings overlying one of the skid tubes and being elongated in a direction transverse to the longitudinal direction of the skid tubes so that the studs of said skid tube extend through the elongated openings and permit lateral movement of the skid tube with respect to the base.

13. A work platform and helicopter assembly of claim 12 wherein said attachment means further comprises a pair of retaining plates having plate holes therein, each retaining plate overlying said elongated opening of said base such that the studs extend through the plate holes, and fastening means for securing said studs to said retaining plates.

14. A work platform and helicopter assembly as claimed in claim 10 wherein said electrical conducting means includes an electrically conducting cable releasably connected between the work platform and the helicopter fuselage.

15. A work platform and helicopter assembly as claimed in claim 10 wherein said electrical conducting means includes said attachment means made from electrically conductive material, said helicopter skid tubes made from electrically conductive material, and further comprising skid supports of electrically conductive material that couple the skid tubes to the helicopter fuselage.

16. A work platform and helicopter assembly as claimed in claim 10 wherein said first portion of said rectangular base includes a cargo storage portion and said second portion includes a workman support portion.

17. A work platform and helicopter assembly as claimed in claim 16 wherein said rectangular base includes side portions extending upwardly therefrom adjacent to the cargo storage portion of the base.

18. A work platform and helicopter assembly as claimed in claim 17 wherein said side portions extend from three side edges of the rectangular base.

19. A work platform and helicopter assembly as claimed in claim 16 further comprising ballast means attached to said work platform opposite the workman support portion.

20. A work platform and helicopter assembly as claimed in claim 19 wherein said ballast means includes portable equipment releasably attachable to said work platform.

21. A work platform and helicopter assembly for working on high-voltage power transmission lines comprising;
   a helicopter having a pair of helicopter skid tubes extending longitudinally beneath the helicopter fuselage;
   a work platform comprising a rectangular base of electrically conductive material having a length along its major axis greater than the distance between said helicopter skid tubes;
   attachment means for attaching said work platform to said helicopter skid tubes such that a first portion of said rectangular base lies between said pair of skid tubes and a second portion extends laterally and outwardly from at least one of said skid tubes;
   electrical conducting means for electrically connecting said work platform with said helicopter fuselage; and
   an electrically conductive wand means for electrically connecting said work platform with a high-voltage power cable, said wand means comprising an elongated member having a cable coupling means for releasably coupling a cable thereto at one end and a gripping means for manually gripping the wand at the opposite end, and conducting means for electrically coupling the wand to said work platform.

22. A work platform and helicopter assembly as claimed in claim 21 wherein said wand conducting means comprises an electrical connector extending from said wand and releasably connected to said work platform.

23. A method for working on high voltage power lines comprising the steps of:
   attaching a workman support platform to a helicopter so that the platform extends laterally in a direction away from the centerline of the helicopter;
   electrically connecting the platform to the helicopter fuselage;
   hovering the helicopter off the ground and adjacent to a power line; and
   electrically coupling a workman-enclosed electrically conductive protective suit with the power line and the platform as the platform is electrically connected with the helicopter fuselage so that the power line, protective suit, work platform and helicopter fuselage are at the same electrical potential.

* * * * *